(No Model.)

T. O. ANDRUS & T. J. NEWTON.
PAN LIFTER.

No. 572,187. Patented Dec. 1, 1896.

Witnesses
W. J. LaVarre,
W. F. Riley

Inventors
Thomas O. Andrus.
Thomas J. Newton.

By their Attorneys,
C. A. Snow & Co.

UNITED STATES PATENT OFFICE.

THOMAS O. ANDRUS AND THOMAS J. NEWTON, OF ALBANY, VERMONT.

PAN-LIFTER.

SPECIFICATION forming part of Letters Patent No. 572,187, dated December 1, 1896.

Application filed September 8, 1896. Serial No. 605,162. (No model.)

*To all whom it may concern:*

Be it known that we, THOMAS O. ANDRUS and THOMAS J. NEWTON, citizens of the United States, residing at Albany, in the county of Orleans and State of Vermont, have invented a new and useful Lifter for Removing Hot Utensils from Stoves, of which the following is a specification.

The invention relates to improvements in lifters for removing hot utensils from stoves.

The object of the present invention is to improve the construction of lifters and to provide a simple, inexpensive, and efficient device adapted for removing hot utensils from stoves and for turning or otherwise changing the position of utensils on a stove.

A further object of the invention is to provide a lifter capable of readily adjusting itself to a receptacle or utensil and adapted to grasp readily and securely a pie-plate, bowl, pan, or other receptacle, and capable of engaging the bail of a pot, kettle, or analogous receptacle.

The invention consists in the construction and novel combination and arrangement of parts hereinafter fully described, illustrated in the accompanying drawings, and pointed out in the claims hereto appended.

Figure 1:
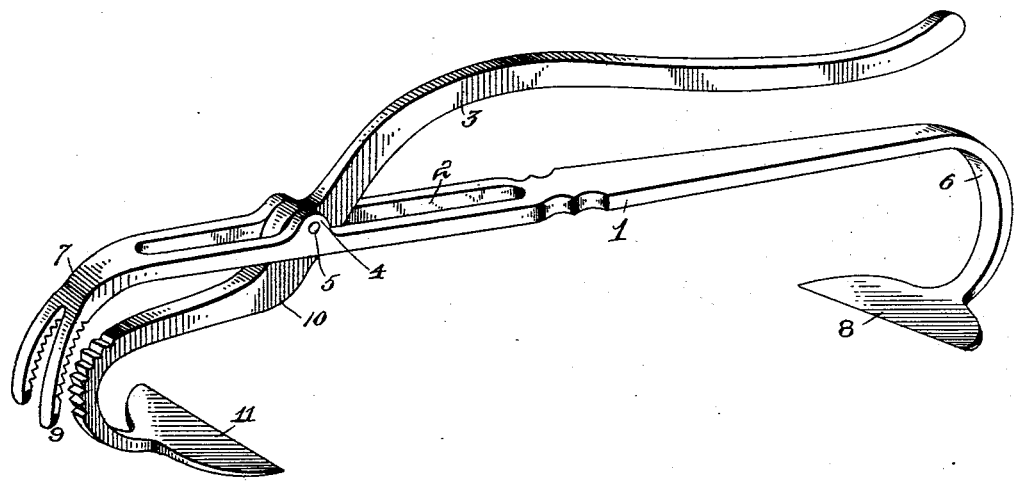
Figure 2:
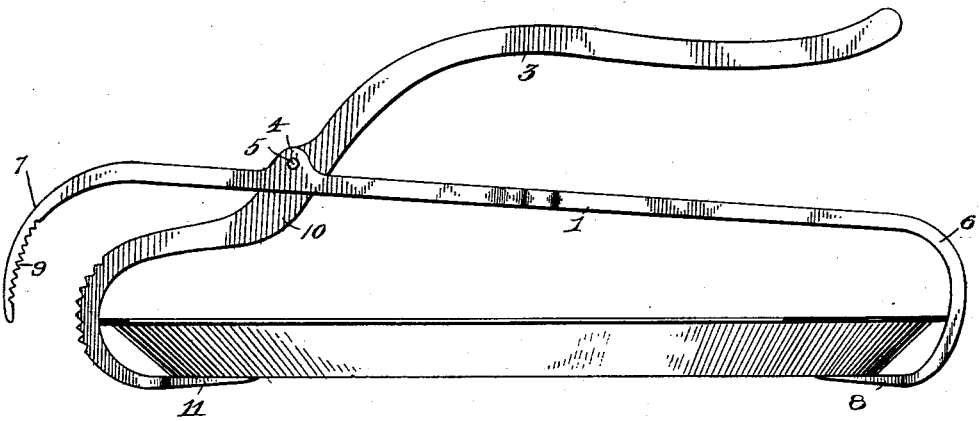

In the drawings, Figure 1 is a perspective view of a lifter constructed in accordance with this invention. Fig. 2 is a side elevation showing the same applied to a pie-plate.

Like numerals of reference designate corresponding parts in all the figures of the drawings.

1 designates a bar provided intermediate of its ends with a longitudinal slot 2, in which a lever 3 is pivoted at a point intermediate of its ends, and the slot extends from the center of the bar 1 to a point within a short distance of one end thereof. At opposite sides of the slot and at a point intermediate of the ends thereof the bar 1 is provided with perforated ears 4, through which passes a pivot 5 for securing the lever to the bar. The ends 6 and 7 of the bar 1 are curved downward and the end 6 is provided with a jaw 8, located beneath the bar 1, extending transversely thereof and consisting of a substantially horizontally disposed plate or flange, preferably segmental and adapted to engage under the bottom of a pie-plate, at one side thereof, for supporting the same. The jaw 8, which may be either formed integral with the bar 1, as illustrated in the accompanying drawings, or constructed separate from it and riveted to the same, is tapered or beveled toward its inner edge to enable it to be readily inserted under a pie-plate. The curved end 6 also forms a hook and is adapted to engage the bail of a pot, kettle, or analogous receptacle to enable such vessel to be readily lifted off a stove. The other end of the bar is curved downward, and is provided at its inner face with teeth or corrugations 9, forming a jaw, and it is preferably bifurcated or forked to spread it to increase its gripping action.

The upper portion of the lever 3 forms a handle and its lower portion is slightly bent below the pivot at 10, and its upper portion is curved downward and inward and is provided with a jaw 11, constructed similar to the jaw 8 and coöperating with the same. The jaws 8 and 11 are adapted, as illustrated in Fig. 2 of the accompanying drawings, to engage the bottom of a pie-plate and support the same. The outer convex edge of the lower curved end of the lever is provided with teeth or serrations, forming an outer jaw, which coöperates with the jaw 9 of the bar when the device is employed as a pair of pincers for engaging the inner and outer edges of a bowl or other receptacle or utensil to enable such vessels to be readily carried from a hot stove.

When the device is employed as a pie-plate lifter or turner, the operator takes hold of the handle end of the lever and the weight of the pie-plate upon the jaws 8 and 11 holds the same firmly in engagement with it, and when the device is used as a pair of pincers for lifting a bowl, jar, or analogous receptacle the operator grasps the handle end of the lever and the adjacent portion of the bar, as will be readily understood.

It will be seen that the device is adapted for carrying or turning pie-plates, that it is capable of firmly engaging a bowl, jar, or similar receptacle and of enabling the same to be carried or turned, and that it is also adapted to receive the bail of a kettle or other receptacle, so that such untensil can be easily moved when hot without the hand of the operator coming in contact with the same.

What we claim is—

1. A device of the class described comprising a bar, provided at its ends with inwardly-extending jaws, and a lever pivoted intermediate of its ends to the bar, having one end located between the said jaws and provided with inner and outer jaws coöperating with the jaws of the bar, whereby the device is adapted to engage the upper edge of a bowl or analogous utensil, and is capable of receiving or supporting and gripping a plate, substantially as described.

2. A device of the class described, comprising a bar, having its ends 6 and 7 bent downward, the end 7 being provided at its inner face with a jaw, the jaw 8 mounted on the end 6 of the bar and disposed substantially horizontally, the lever pivoted intermediate of its ends to the bar, extending below the same and provided at the outer face of its lower end with a jaw, arranged to coöperate with the jaw of the end 7 to form a pair of pincers, and the jaw 11 located at the inner side of the lower end of the lever, disposed substantially horizontally and coöperating with the jaw 8, substantially as described.

3. A device of the class described comprising a bar having its ends 6 and 7 curved downward and provided intermediate of the same with a longitudinal slot, the end 7 being forked or bifurcated and having teeth at its inner face to form a jaw, the jaw 8 arranged at the end 6 of the bar and located beneath the latter, the lever pivoted intermediate of its ends in the slot and having its lower end curved downward and inward and provided at its outer face with teeth to form a jaw, and a jaw 11 disposed at the lower end of the lever, substantially as described.

In testimony that we claim the foregoing as our own we have hereto affixed our signatures in the presence of two witnesses.

THOMAS O. ANDRUS.
THOMAS J. NEWTON.

Witnesses:
M. B. CHAFEY,
AGNES O. CHAFEY.